US010272395B1

(12) United States Patent
Patton

(10) Patent No.: US 10,272,395 B1
(45) Date of Patent: Apr. 30, 2019

(54) MOBILE SUBMERSIBLE MIXING APPARATUS

(71) Applicant: Mark Patton, Conroe, TX (US)

(72) Inventor: Mark Patton, Conroe, TX (US)

( * ) Notice: Subject to any disclaimer, the term of this patent is extended or adjusted under 35 U.S.C. 154(b) by 0 days.

(21) Appl. No.: 14/717,748

(22) Filed: May 20, 2015

Related U.S. Application Data

(60) Provisional application No. 62/000,695, filed on May 20, 2014.

(51) Int. Cl.

| | |
|---|---|
| ***B01F 3/04*** | (2006.01) |
| ***B01F 13/00*** | (2006.01) |
| ***B01F 7/00*** | (2006.01) |
| ***B01F 5/02*** | (2006.01) |
| ***B01F 5/12*** | (2006.01) |
| ***B01F 7/06*** | (2006.01) |
| ***C02F 3/20*** | (2006.01) |
| ***B01F 15/00*** | (2006.01) |
| *C02F 103/06* | (2006.01) |

(52) U.S. Cl.
CPC ...... *B01F 3/04248* (2013.01); *B01F 3/04588* (2013.01); *B01F 5/0206* (2013.01); *B01F 5/12* (2013.01); *B01F 7/00341* (2013.01); *B01F 7/06* (2013.01); *B01F 13/0005* (2013.01); *B01F 13/0042* (2013.01); *B01F 15/00545* (2013.01); *C02F 3/205* (2013.01); *B01F 2215/0052* (2013.01); *C02F 2103/06* (2013.01); *C02F 2203/008* (2013.01); *C02F 2303/20* (2013.01)

(58) Field of Classification Search
CPC .............. B01F 13/0035; B01F 13/0016; B01F 13/0038; B01F 13/004; B01F 13/0042; B01F 13/0037; B01F 3/04248; B01F 3/04588; B01F 7/00341; B01F 13/0005; B01F 5/00545; B01F 5/0206; B01F 7/06; B01F 5/12; B01F 2215/0052; F04B 43/06; C02F 3/205; C02F 2203/008; C02F 2103/06; C02F 2303/20
See application file for complete search history.

(56) References Cited

U.S. PATENT DOCUMENTS 2,608,230 A * 8/1952 Cuesta ...................... B60C 3/06 152/548
2,884,039 A * 4/1959 Hicks ...................... B60C 5/005 152/450
3,217,654 A * 11/1965 Springer ............. F04D 29/2277 415/121.1
(Continued)

FOREIGN PATENT DOCUMENTS

DE 2324433 A1 * 11/1974 .......... B01F 3/04106

OTHER PUBLICATIONS

Gormis-Bellmunt et al. "Design Rules for Actuators in Active Mechanical Systems" Chapter 2 Actuator Design Analysis published 2010.*

*Primary Examiner* — Stephen Hobson
(74) *Attorney, Agent, or Firm* — Wayne Edward Ramage; Baker Donelson

(57) ABSTRACT

A mobile submersible mixer comprising a mobile platform, frame or chassis with a plurality of wheels, with one or more mixing jets or systems mounted thereon. The apparatus also may comprise an aeration system and real-time sampling system. The apparatus is introduced into a pit or tank, typically by rolling the mixer down a ramp into the pit or tank.

17 Claims, 14 Drawing Sheets

(56) References Cited

U.S. PATENT DOCUMENTS

| | | | | | |
|---|---|---|---|---|---|
| 3,434,598 | A * | 3/1969 | Daman | C02F 1/5281 | 210/199 |
| 3,614,072 | A * | 10/1971 | Brodie | B01F 3/04595 | 261/36.1 |
| 3,958,895 | A * | 5/1976 | Brisson | F04D 1/006 | 415/121.1 |
| 4,145,383 | A * | 3/1979 | Randall | B01F 3/04609 | 261/29 |
| 4,441,452 | A * | 4/1984 | Strain, Jr. | A01K 63/042 | 119/215 |
| 4,606,801 | A * | 8/1986 | Prestridge | B01D 17/06 | 204/570 |
| 4,909,936 | A * | 3/1990 | Arbisi | B01F 3/04595 | 210/220 |
| 5,330,639 | A * | 7/1994 | Murphree | B01F 3/04765 | 210/170.05 |
| 6,364,628 | B1 * | 4/2002 | Potts | F04D 25/02 | 417/234 |
| 8,221,631 | B1 * | 7/2012 | Bhaskar | B01F 3/04106 | 210/143 |
| 2006/0162833 | A1 * | 7/2006 | Bodony | B60C 7/105 | 152/300 |
| 2010/0236647 | A1 * | 9/2010 | Simnioniw | E03B 11/10 | 137/565.01 |
| 2014/0077484 | A1 * | 3/2014 | Harrell | B60P 3/2205 | 280/837 |
| 2015/0108054 | A1 * | 4/2015 | Bleth | B01F 3/04517 | 210/170.09 |

* cited by examiner

MOBILE SUBMERSIBLE MIXING APPARATUS

This application claims benefit of and priority to U.S. Provisional Application No. 62/000,695, filed May 20, 2014, by Mark Patton, and is entitled to that filing date for priority. The specification, figures, appendix and complete disclosure of U.S. Provisional Application No. 62/000,695 are incorporated herein by specific reference for all purposes.

FIELD OF INVENTION

This invention relates to an apparatus and system for improved mixing of produced water.

BACKGROUND OF THE INVENTION

There are significant benefits to mixing of water or produced water in tanks and pits. A static, unmixed pit or tank will quickly stratify into several layers, leading to inconsistent water quality and elevated, inconsistent bacteria levels. In a static, unmixed pit, for example, chlorides will increase with depth and temperature will decrease with depth, thereby created zones at different depths with changing water quality. Transfer pump mixing can be used to "turn" pits, but often will lead to "short circuiting," creating horizontal or lateral zones in addition to vertical zones. Proper mixing requires mixing of the entire body of fluid in the tank or pit, and thus requires vertical mixing as well as horizontal mixing.

SUMMARY OF INVENTION

In various embodiments, the present invention comprises a mobile submersible mixer comprising a mobile platform, frame or chassis with a plurality of wheels, with one or more mixing jets or systems mounted thereon. The apparatus also may comprise an aeration system and real-time sampling system. The apparatus is introduced into a pit or tank, typically by rolling the mixer down a ramp into the pit or tank. While the invention described herein is in the context of treated a pit with produced water from hydraulic fracturing operations, it may be used with a pit or tank with other fluids requiring mixing for a variety of commercial or industrial processes.

In one embodiment, the submersible mixer chassis comprises an open framework of tubes or bars to allow the relatively unobstructed flow of produced water in and around the mixer and the mixing jets. In alternative embodiments, devices to redirect or channel fluid flow, such as fins or plates or funnels, may be added to create or direct certain flow patterns.

The mixing jet (or jets) can be of a variety of types. In one embodiment, the mixing jet is a tripod-mounted horizontal impeller that spins at high rates to provide mixing. In an alternative embodiment, a pneumatic pump is used to move the water. In yet a further embodiment, a horizontal diffusing mixer (inflow through the ends, with vertical laminar flow from the top), such as the GridBee GS-14, may be used. The horizontal diffusing mixer may be collapsible, allowing for easy transport and movement when mounted on the mixer chassis.

Any suitable number of tires may be used, of a variety of types. In the embodiment shown, "sand" or "balloon" tires are used to enhance buoyancy of the apparatus, prevent sinking into the sediment in the bottom of the pit or tank, and distribute the weight of the apparatus over a larger surface area to limit the weight on the pit or tank liner (i.e., reduce the possibility of tears or holes or breaks). The tires may be solid, or inflated with air or gas. The mixer may be moved from location to location within the pit or tank, as desired.

An autosampling apparatus may be attached to the chassis or frame. The autosampling system may be used to determine when homogeneity in the pit fluids is achieved.

Similarly, an aeration system may be attached to the chassis or frame to introduce air (or other gas) in and around the mixing jets for aeration and treatment of the produced fluid. The aeration points may be placed along the base so the air bubbles up into the mixing jet area, but aeration points may be placed anywhere on the chassis or frame. Aeration points may be bubble diffusers, air jets, or the like.

DETAILED DESCRIPTION OF EXEMPLARY EMBODIMENTS

In various exemplary embodiments, as seen in FIGS. 1-4 and 12-4, the present invention comprises a mobile submersible mixer comprising a mobile platform, frame or chassis 2 with a plurality of wheels 6, with one or more mixing jets or mixing apparatuses 4 mounted thereon. The mixing apparatus may be removable from the mobile platform, frame or chassis. The apparatus also may comprise an aeration system and real-time sampling system. The apparatus is introduced into a pit or tank, typically by rolling the mixer down a ramp into the pit or tank. A rope or line can be used to control the descent of the apparatus, and allow for easy retrieval. While the invention described herein is in the context of treated a pit with produced water from hydraulic fracturing operations, it may be used with a pit or tank with other fluids requiring mixing for a variety of commercial or industrial processes.

In the embodiment shown, the submersible mixer chassis 2 comprises an open framework of tubes or bars to allow the relatively unobstructed flow of produced water in and around the mixer and the mixing jets. The framework may be rigid or fixed, or collapsible or foldable in whole or in part. In alternative embodiments, devices to redirect or channel fluid flow, such as fins or plates or funnels, may be added to the chassis ti create or direct certain flow patterns.

Figure 1:
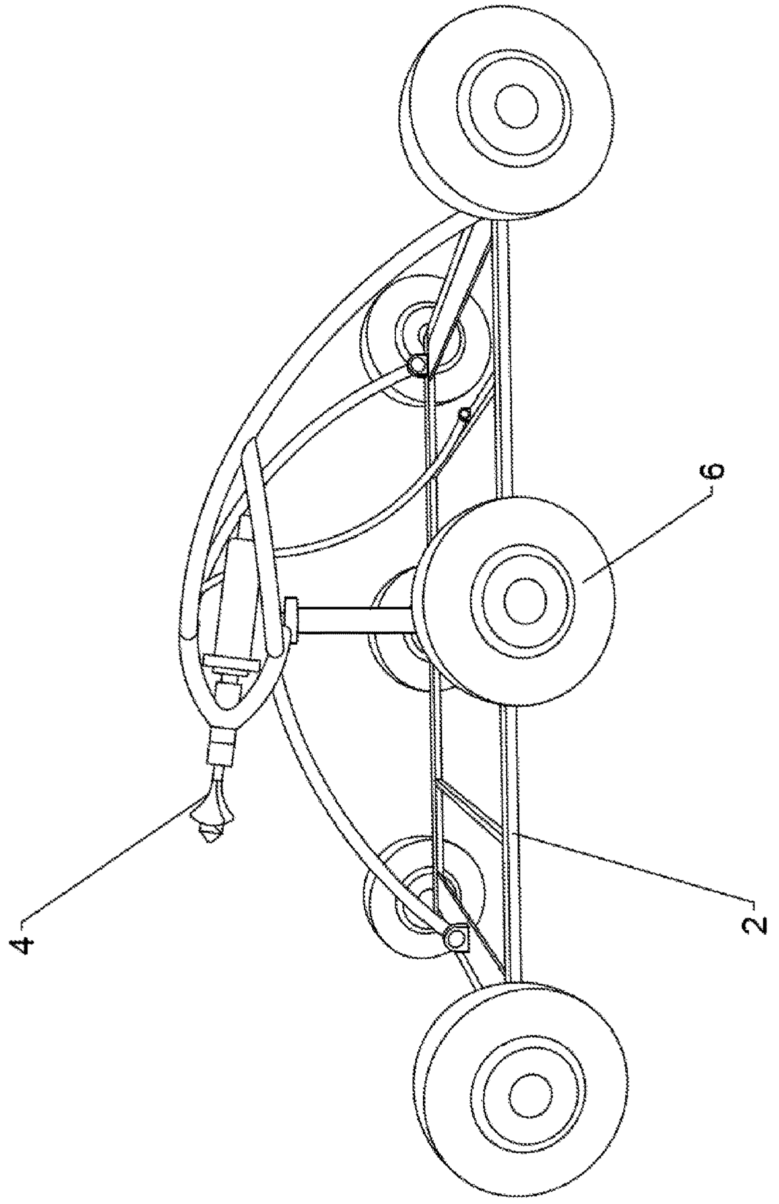
FIG. 1 shows a view of a mobile submersible mixer in accordance with an embodiment of the present invention.
Figure 2:
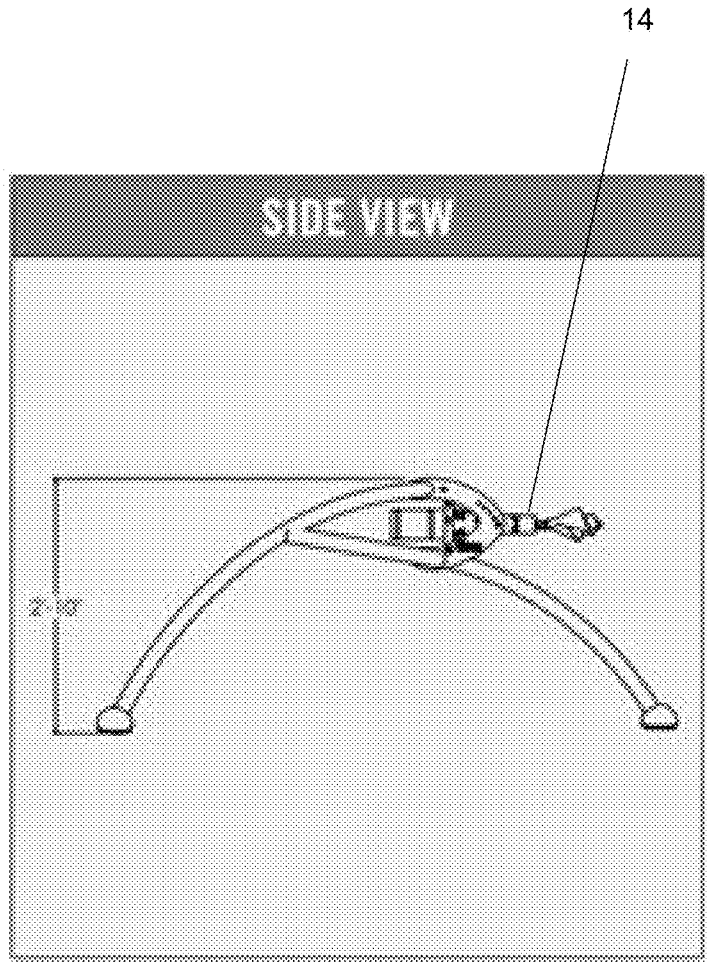
FIG. 2 shows a side view of a mixing impeller.
Figure 3:
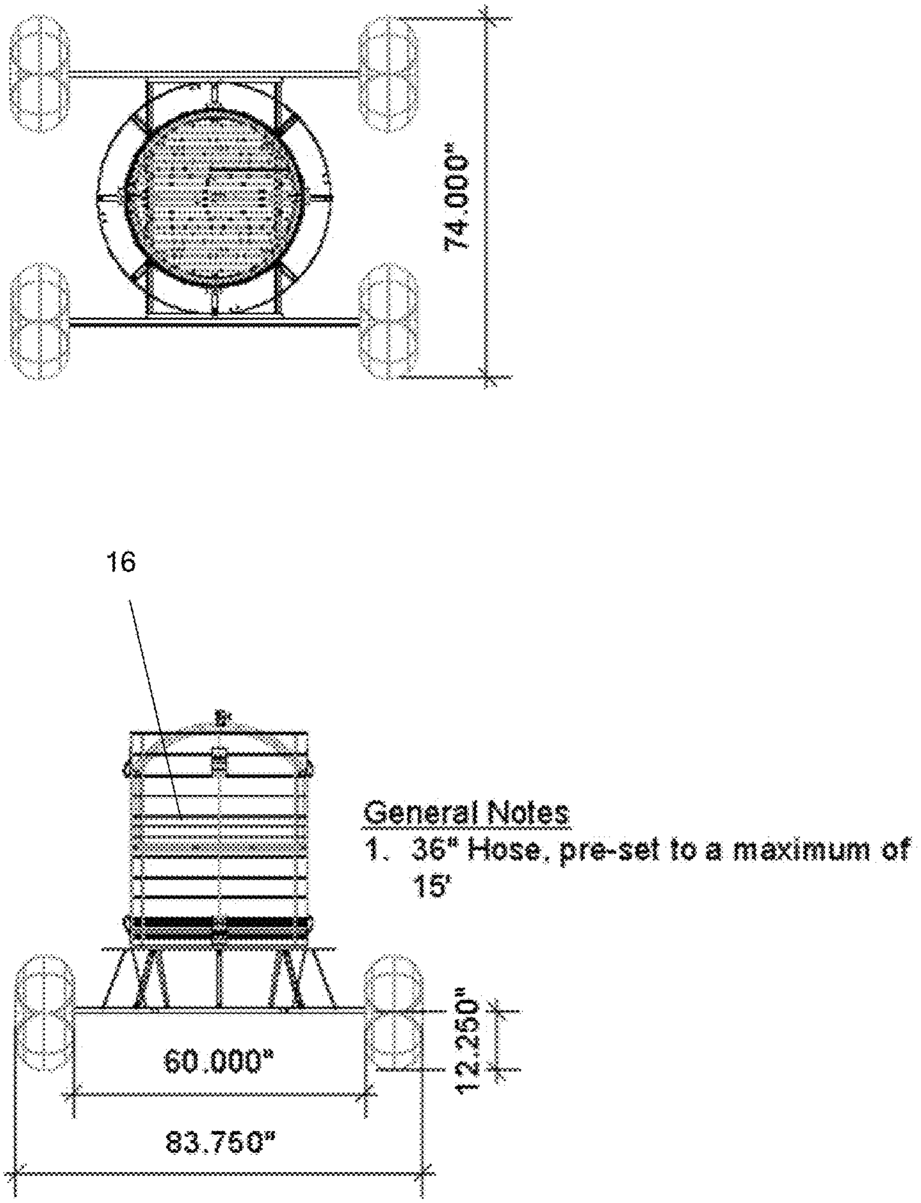
FIGS. 3 and 4 show views of a pneumatic pump mixer.
Figure 4:
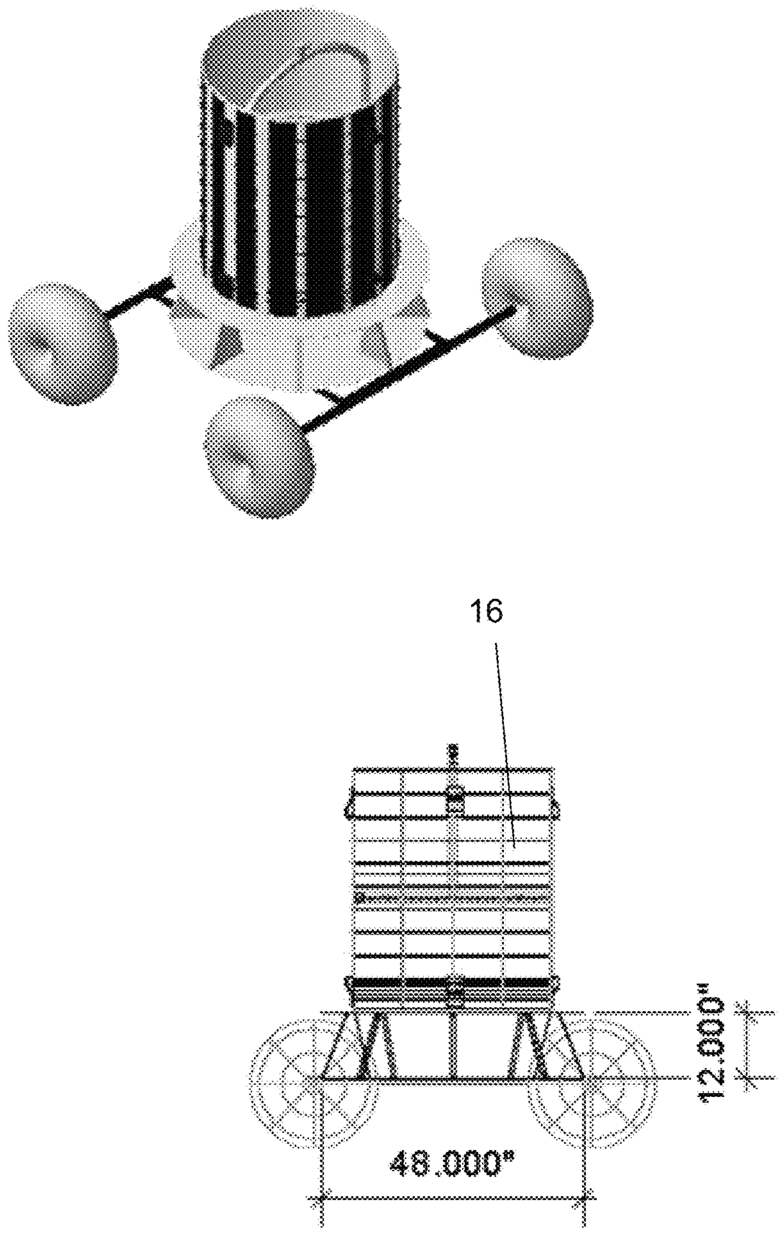

The mixing jet (or jets) or apparatus 4 can be of a variety of types. In one embodiment, as seen in FIGS. 1 and 2, the mixing jet is a tripod-mounted horizontal impeller 14 that spins at high rates to provide mixing, such as the PAX Water Mixer PWM600. In an alternative embodiment, as seen in FIGS. 3 and 4, a pneumatic pump 16 is used to move the water. In yet a further embodiment, a horizontal diffusing mixer (inflow through the ends, with vertical laminar flow from the top), such as the GridBee GS-14, may be used.

Figure 6:
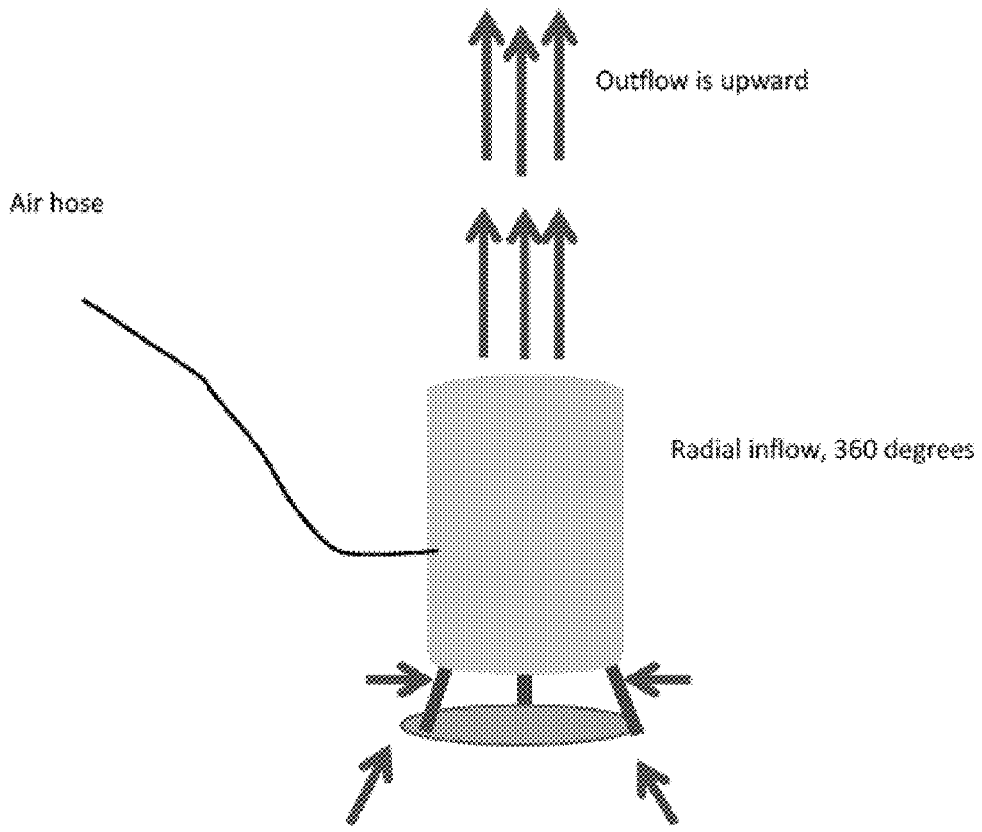
FIG. 6 shows a view of an aerating bubbler.
Figure 12:
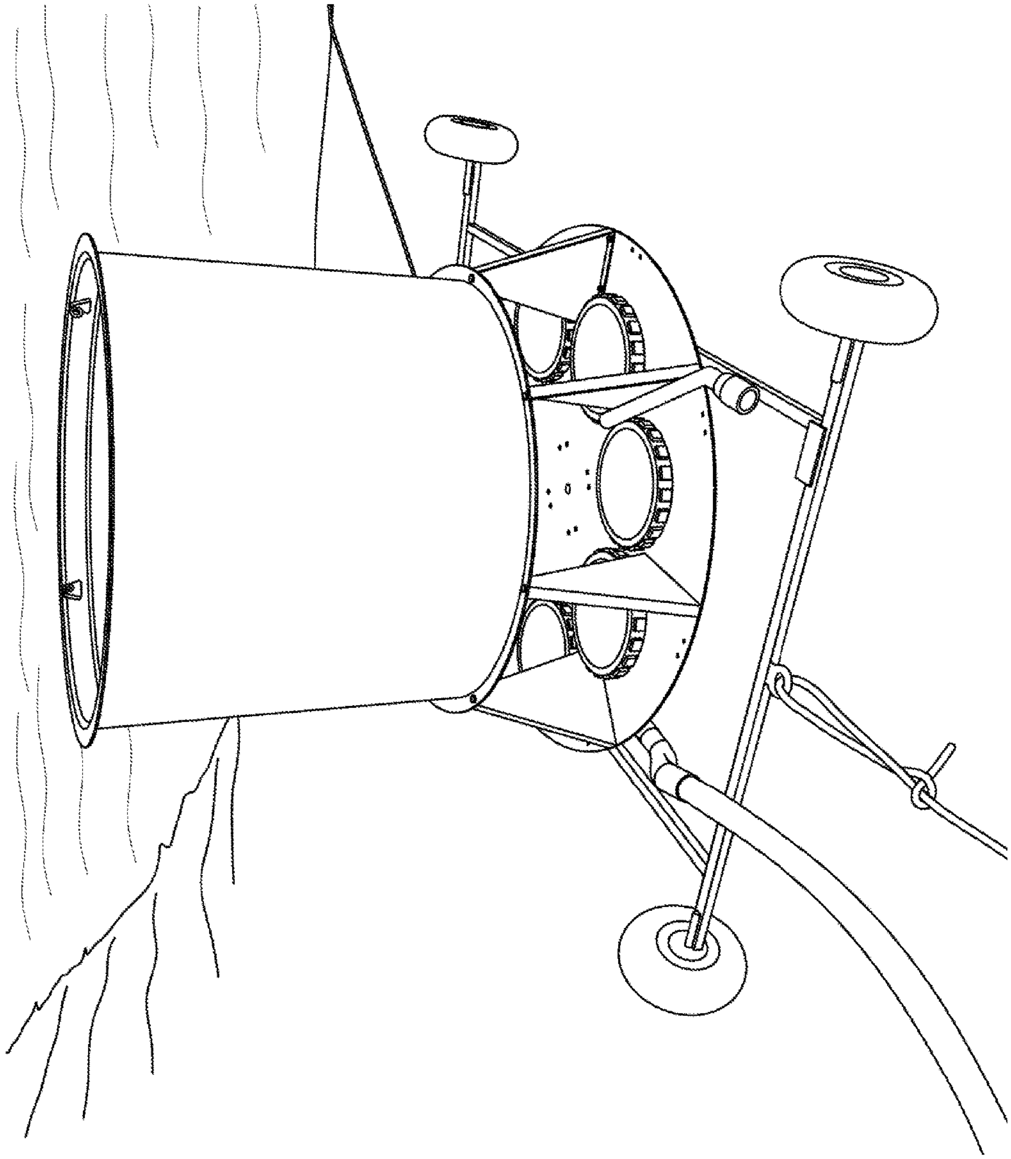
FIGS. 12 and 13 shows views of a mobile submersible mixer chassis with a columnar air-powered pedestal mixer.
Figure 13:
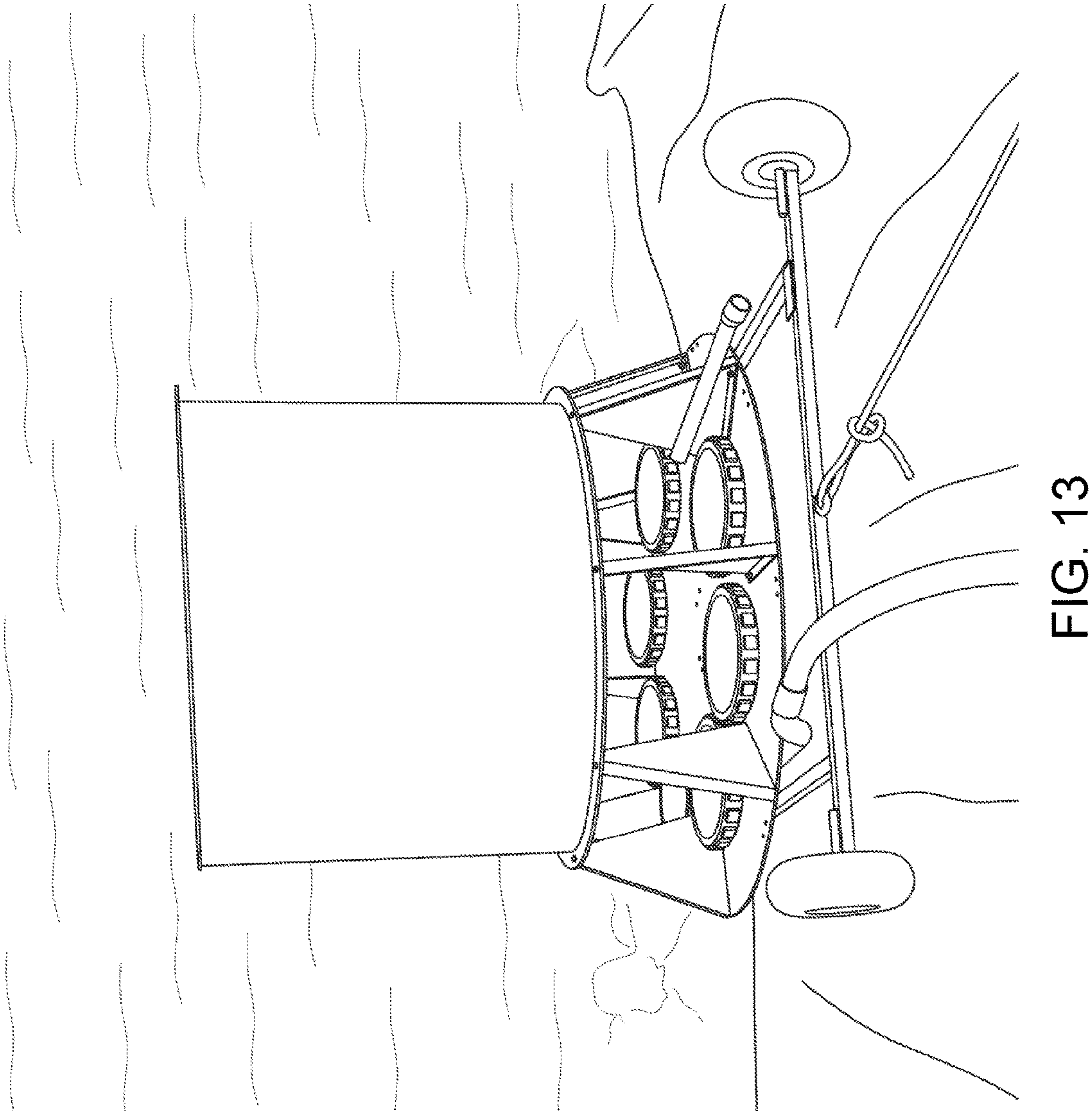
Figure 14:
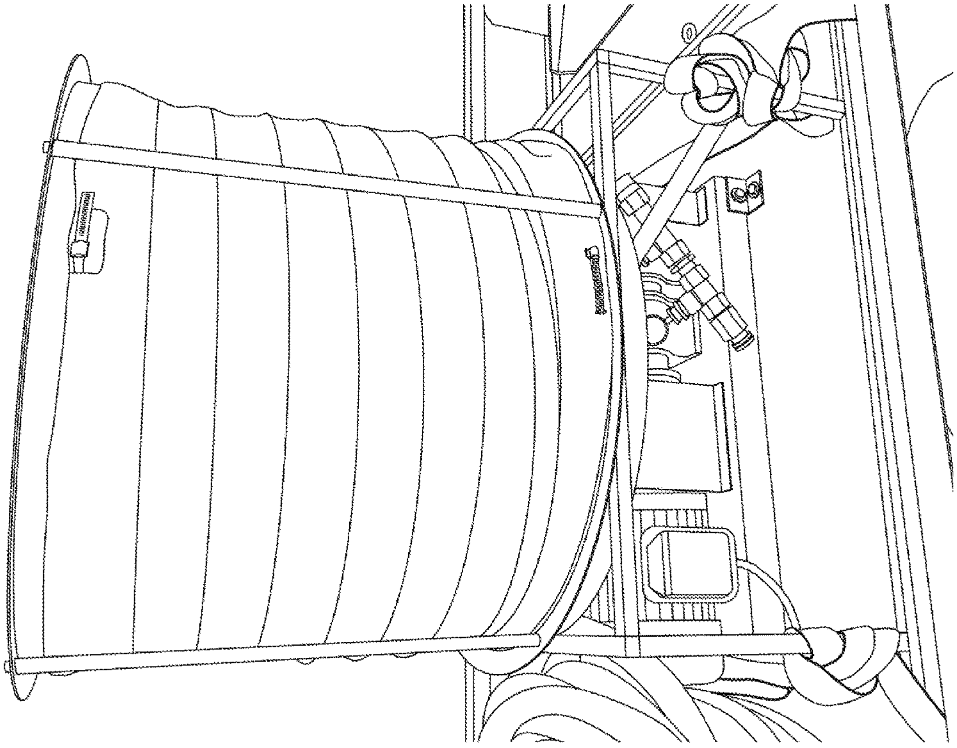
FIG. 14 shows a view of a collapsible columnar air-powered pedestal mixer.

In a particular embodiment, a columnar air-powered pedestal mixer, such as the GridBee AP, may be used, as seen in FIGS. 6 and 12-13. Water enters the bottom in radial flow, with flow upward from the top. Air-powered pumps may be located on the base or at points in the column. Alternatively, an air pump or compressor outside the pit or tank may feed an air hose which is connected to the mixing apparatus. Nozzle end or diffusers can be located at different locations within or below the column. The column mixer may be collapsible (e.g., accordion-style), as seen in FIG. 14, allowing for easy transport and movement when mounted on the mixer chassis. In yet a further embodiment, an electrostatic mixer or aerator may be used.

Any suitable number of tires may be used, of a variety of types. In the embodiment shown, "sand" or "balloon" tires are used to enhance buoyancy of the apparatus, prevent sinking into the sediment in the bottom of the pit or tank, and distribute the weight of the apparatus over a larger surface area to limit the weight on the pit or tank liner (i.e., reduce the possibility of tears or holes or breaks). The tires may be solid, or inflated with air or gas. The mixer may be moved from location to location within the pit or tank, as desired.

Figure 5:
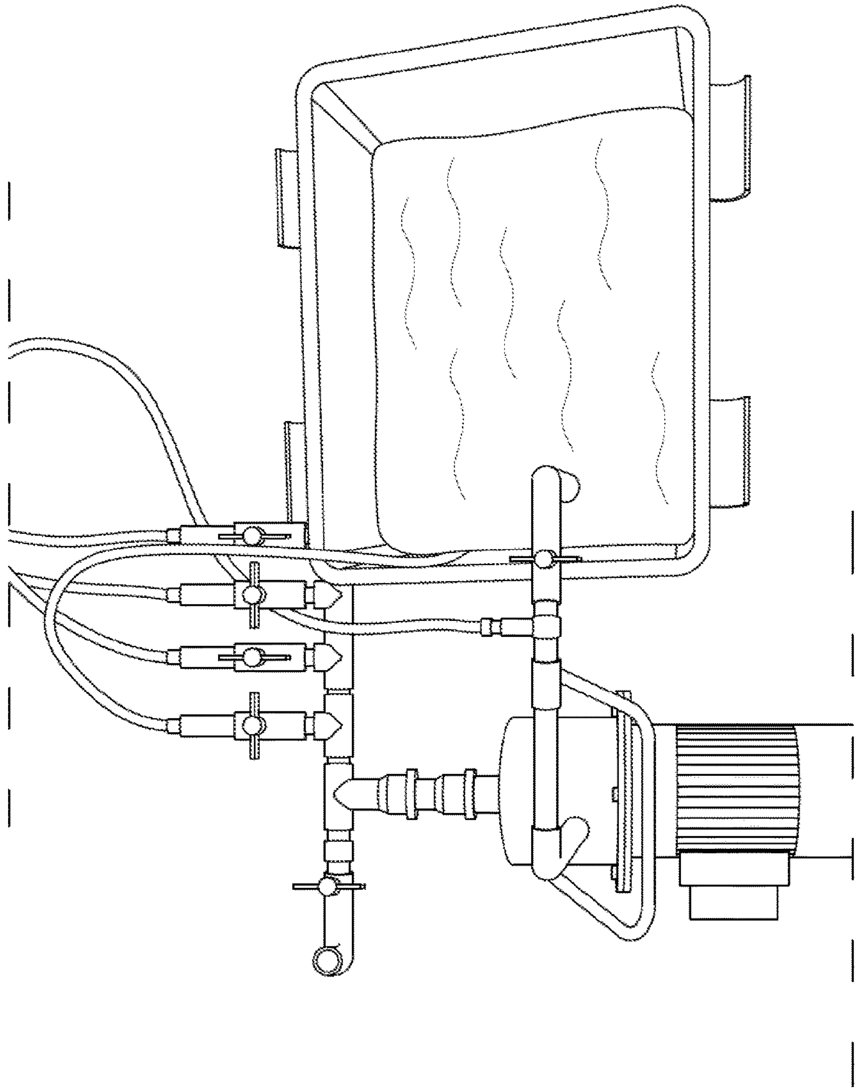
FIG. 5 shows a view of an autosampler.

An autosampling apparatus, as seen in FIG. 5, may be attached to the chassis or frame. The autosampling system may be used to determine when homogeneity in the pit fluids is achieved.

Similarly, an aeration system may be attached to the chassis or frame to introduce air (or other gas) in and around the mixing jets for aeration and treatment of the produced fluid. The aeration points may be placed along the base so the air bubbles up into the mixing jet area, but aeration points may be placed anywhere on the chassis or frame. Aeration points may be bubble diffusers, air jets, or the like, as seen in FIG. 6.

Figure 7:
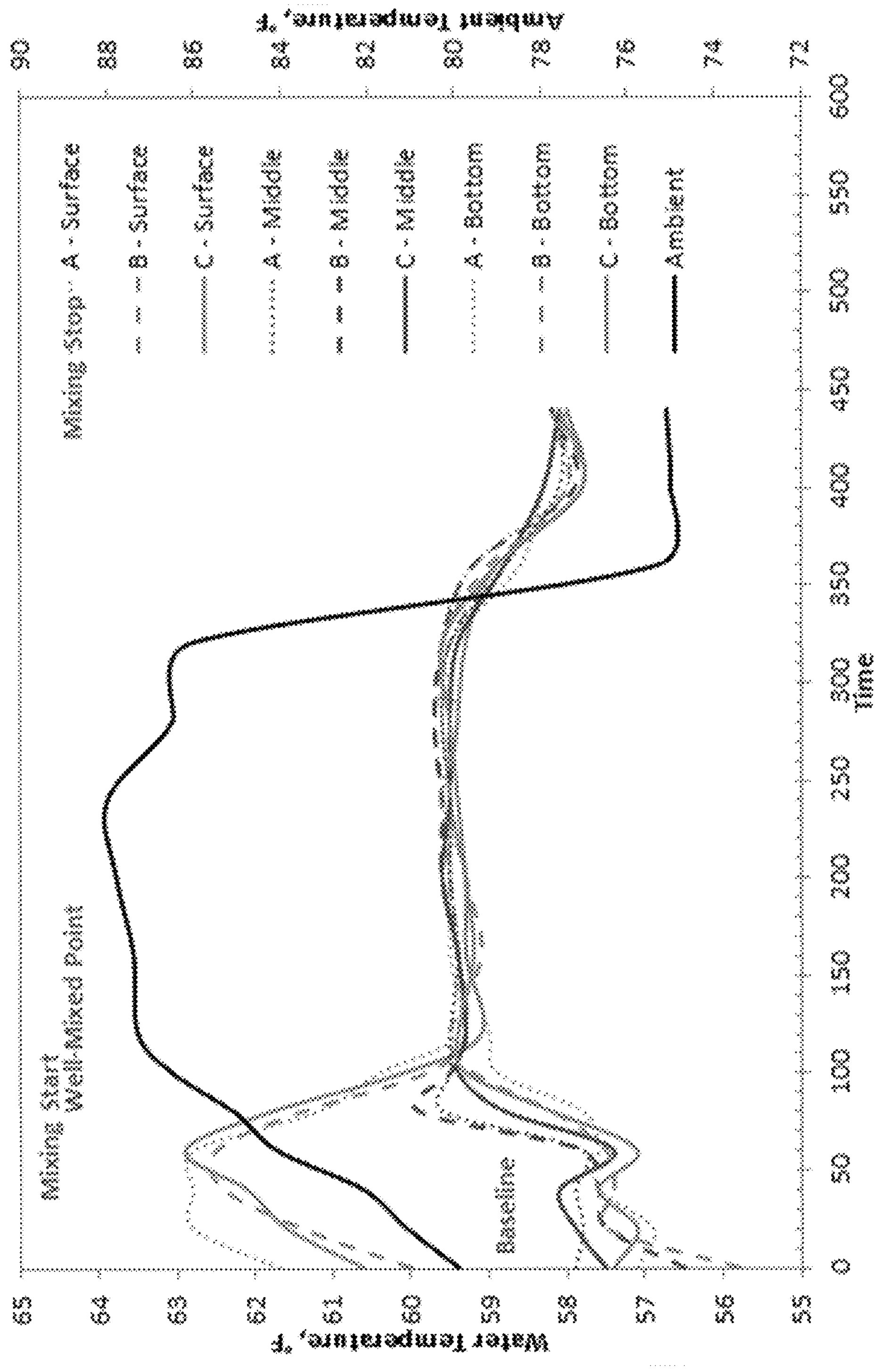
FIG. 7 shows a chart of water temperature vs. time.
Figure 8:
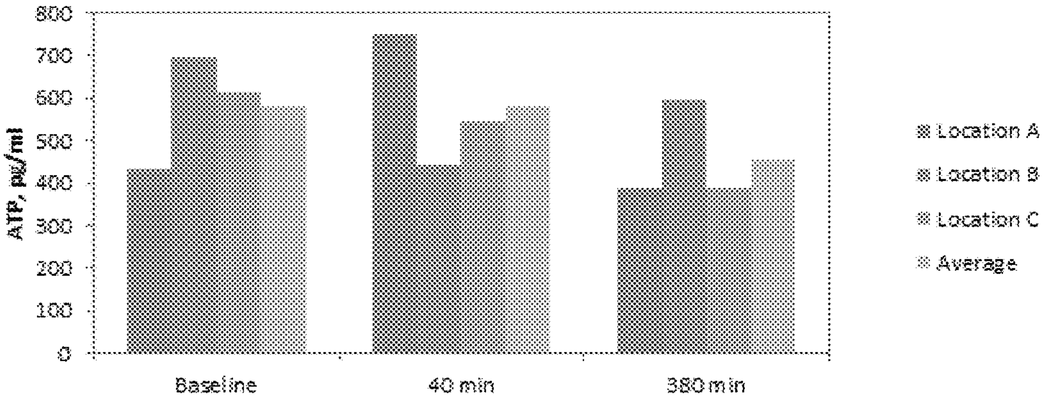
FIG. 8 shows a chart of bacteria counts vs. time (with a 21% reduction in bacteria).
Figure 9:
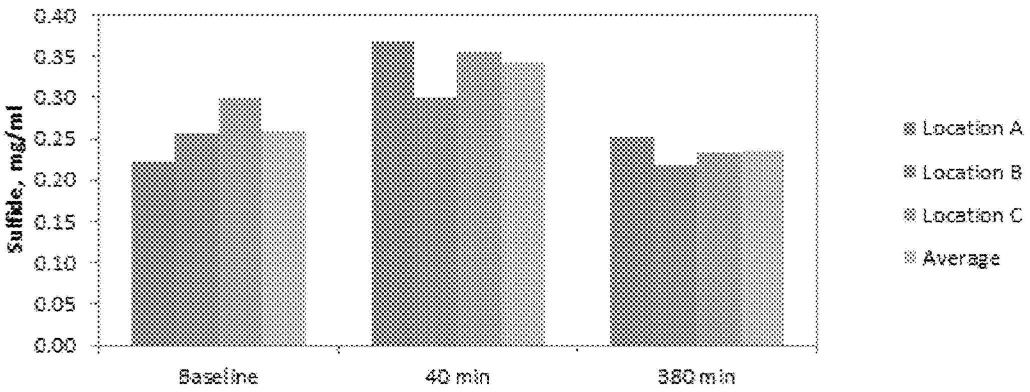
FIG. 9 shows a chart of sulfide concentration vs. time (with a 31% reduction in sulfides).
Figure 10:
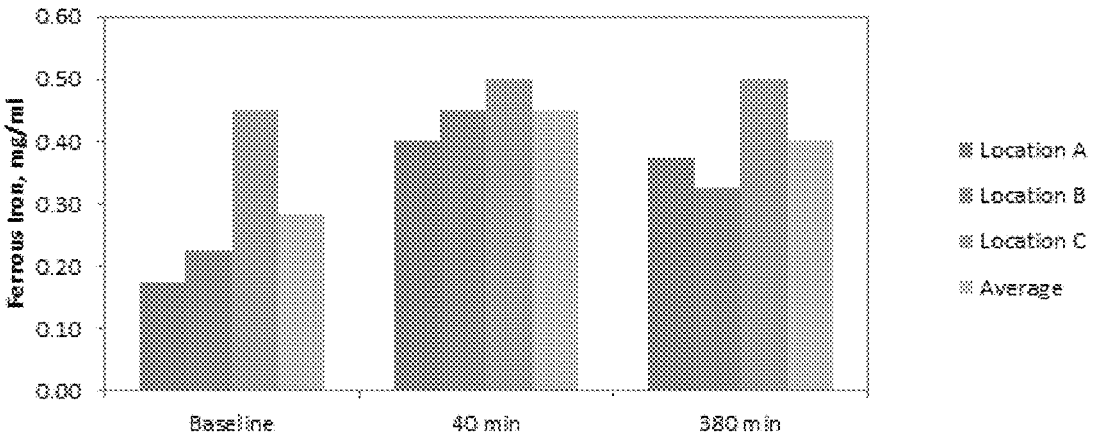
FIG. 10 shows a chart of ferrous iron concentration vs. time (with a 11% reduction in ferrous iron).
Figure 11:
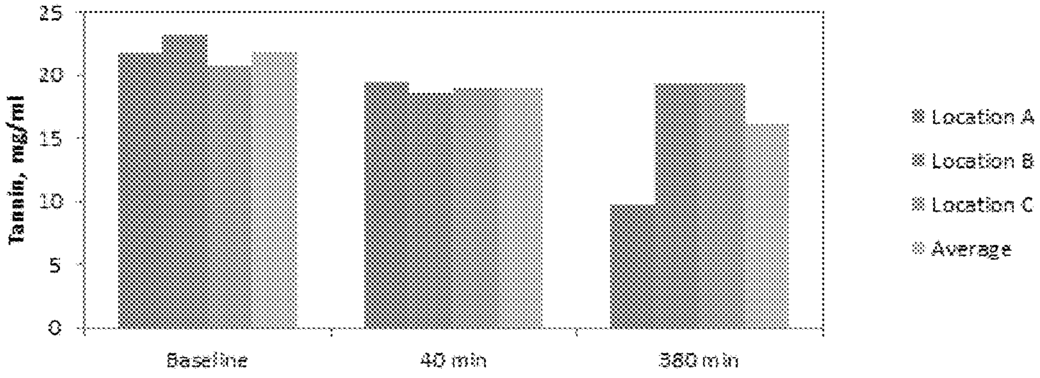
FIG. 11 shows a chart of tannin concentration vs. time (with a 15% reduction in tannins).

FIG. 7 shows an example of how the present invention homogenizes water temperature at various levels and various locations in a produced water pit over time. FIGS. 8-11 show how the present invention improves overall water quality by reducing bacteria, sulfides, ferrous iron, and tannins.

With regard to bacteria, an unmixed pit will have up to 10× higher bacteria levels than a similar pit with the present invention applied. Submersible mixing prevents or inhibits bacteria growth and reduces existing bacteria levels. Other benefits include the reduction of evaporation by decreasing surface temperatures.

When recycling produced water, homogeneous water quality can be extremely important, especially when using a cross-linked gel method as a completion technique (i.e., for hydraulic fracturing). Produced water quality is initially highly variable, and the recycling of produced water for use with cross-linked gel fracturing is problematic. The present invention ensures produced water homogeneity, and allows for produced water recycling, especially for cross-linked gel fracturing.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for mixing produced water, comprising:

a pit or tank containing produced water, said pit or tank comprising a liner and a ramp into the pit or tank;

a mobile submersible mixer, said mobile submersible mixer comprising a top, an open framework chassis with three or more tires attached thereto, and a mixing jet securely affixed to the top; and a line attached to a point on the chassis;

wherein the mobile submersible mixer is adapted to roll down said ramp into said tank or pit containing produced water and is operable to mix the produced water when the mobile submersible mixer is fully submerged therein; and further wherein the line is adapted to control the descent of the mobile submersible mixer down the ramp and to retrieve the mobile submersible mixer from the tank or pit.

2. The system of claim 1, wherein there are four or more tires.

3. The system of claim 1, wherein the tires are sand-filled tires.

4. The system of claim 1, wherein the mixing jet comprises an impeller.

5. The system of claim 1, wherein the mixing jet comprises a horizontal diffusing mixer.

6. The system of claim 1, wherein the mixing jet comprises a pneumatic pump.

7. The system of claim 1, wherein the mixing jet comprises a columnar air-powered pedestal mixer.

8. The system of claim 1, wherein the mixing jet comprises an electrostatic mixer.

9. The system of claim 1, further comprising an aeration system.

10. The system of claim 1, further comprising an autosampling system.

11. The system of claim 1, wherein the mixing j et is removable from the chassis.

12. The system of claim 1, wherein the tires are balloon tires.

13. A mobile vehicle for mixing produced water in a tank or pit, comprising:

an open framework chassis with a top and a bottom, with three or more wheels attached thereto;

a mixing jet removably affixed to the top of the chassis;

a line attached to the chassis;

an aerator affixed to the chassis; and an autosampler affixed to the chassis;

wherein the mobile vehicle is operable to mix produced water in a tank or pit when the mobile vehicle is fully submerged in said produced water.

14. The vehicle of claim 13, wherein there are four wheels.

15. The vehicle of claim 13, wherein the mixing jet comprises a columnar air-powered pedestal mixer.

16. The vehicle of claim 13, wherein the tires are sand-filled tires.

17. The vehicle of claim 13, wherein the tires are balloon tires.

* * * * *